July 22, 1969   J. R. TENCH   3,457,119
STORAGE BATTERY WITH DETACHABLE COVER HAVING LIFTING MEANS
Filed Dec. 21, 1966
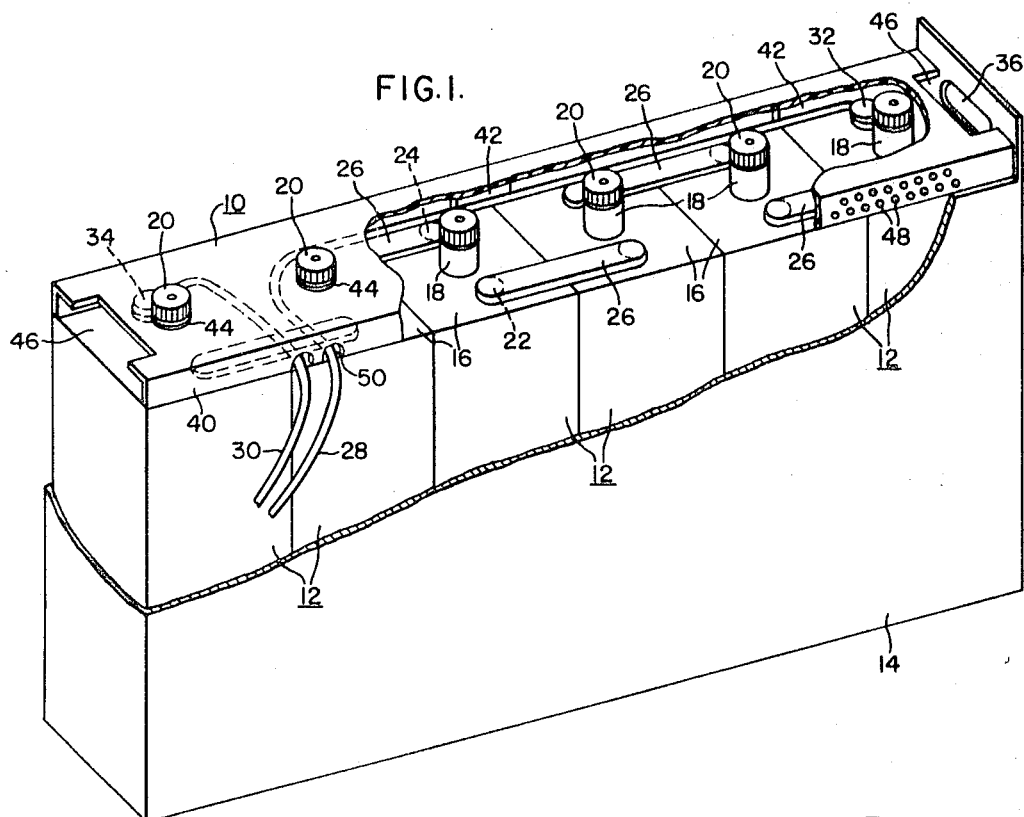
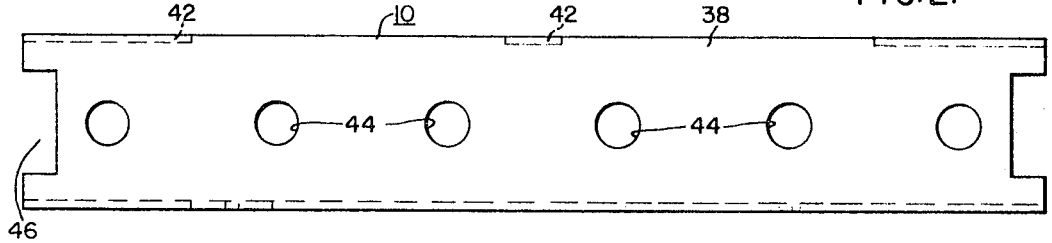
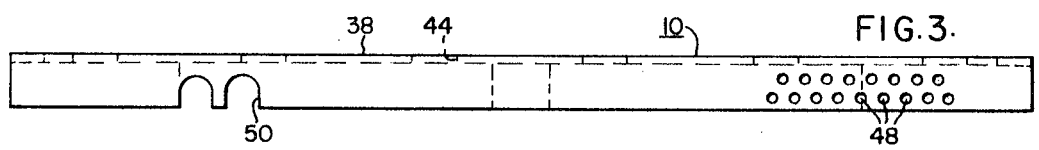
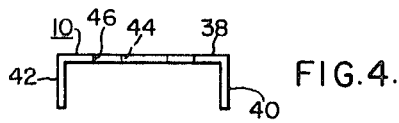
WITNESSES
INVENTOR
John R. Tench
BY
ATTORNEY

United States Patent Office 3,457,119
Patented July 22, 1969

3,457,119
STORAGE BATTERY WITH DETACHABLE COVER HAVING LIFTING MEANS
John R. Tench, Mount Lebanon, Pa., assignor to Westinghouse Electric Corporation, Pittsburgh, Pa., a corporation of Pennsylvania
Filed Dec. 21, 1966, Ser. No. 603,618
Int. Cl. H01m 1/02, 1/06
U.S. Cl. 136—170                    1 Claim

ABSTRACT OF THE DISCLOSURE

A storage battery assembly including a plurality of cell units, each unit having a top surface and a vent extending therefrom, a cell connecting bar between adjacent cells. A box-like container for the units having an upper open end above which the vents and connecting bars extend. A cover for the cells having an inverted-channel shape including an intermediate plane portion and a down-turned flange along each edge thereof and resting on the cell unit surfaces. The cover forming a compartment between the cell unit top surfaces and the intermediate plane portion and the cell vents extending through and above the cover.

---

This invention relates to a one-piece detachable cover for storage batteries.

There are several disadvantages occuring when a storage battery cell top is uncovered and exposed. One primary disadvantage is the exposure of the battery terminals and cell connectors to acid during operation of the battery. This problem is particularly prominent when a battery is charged because acid fumes and acid spray on the connectors and terminals. Other disadvantages include the collection of dust and the difficulty of cleaning the top of a battery. Also, in mining applications where swirling coal dust accumulates under the cell connectors and around the posts shorting occurs, reduces the efficiency, and causes shorter life.

One attempt to overcome the foregoing difficulties has included a non-detachable battery top composed of a hard rubber composition which is molded over and around the cell connectors with only the vent caps and terminal posts extending above the top. One disadvantage of such a top is the inability to pull and replace a defective cell to make cell repairs. In addition, such an integral top construction does not permit the checking of the cell voltage.

In accordance with the invention it has been found that the foregoing difficulties may be overcome by providing a detachable one-piece cover which covers the cell connectors, the terminal posts and the cell cover permitting only the vent caps to extend through and above the top surface of the cover. As a result any acid fumes escaping through the vent cap are prevented from attacking the terminal posts and cell connectors. Other advantages of the detachable cover include the ability to wash the top of the cover without causing acid to seep to the terminal posts or connectors. In addition, the cover is vented to permit heat to escape.

Accordingly, it is a general object of this invention to provide a storage battery cover for preventing the accumulation of dust and acid on the cell covers, cell connectors, and terminal posts of industrial batteries.

It is another object of this invention to provide storage battery cover which is detachably mounted to permit access to and repair of the individual battery cells and covers when necessary.

Finally, it is an object of this invention to satisfy the foregoing objects and desiderata in a simple and expedient manner.

Briefly, the device of the present invention is a cover for a multi-celled storage battery having a plurality of vents extending from the top side of each cell and having cell connecting bars on the top side of the battery and extending between adjacent pairs of cells, the cover being an inverted channel member having an intermediate plane portion and a down-turned flange along each edge thereof, the flanges engaging the top surface of the battery and forming therewith a chamber containing the terminal posts and cell connectors, and the intermediate portion of the cover having spaced vent openings.

For a better understanding of the nature and objects of this invention, reference is made to the drawings, in which:

FIGURE 1 is a perspective view of a detachable cover mounted across the cells of a storage battery, portions of the cover being broken away to show the top surface of the cells;

FIG. 2 is a plan view of the cover;

FIG. 3 is an elevational view of the cover; and

FIG. 4 is an end view of the cover.

In accordance with the invention a one-piece detachable cover 10 is mounted on a plurality of storage battery cells 12 which are disposed in a container or tray 14 in a conventional manner. As shown in FIG. 1, all of the cells 12 are aligned, but it is understood that other arrangements and a greater or lesser number of cells 12 may be used. Each cell 12 has a top surface 16 from which extends a tubular filling well 18 through which acid may be added to the cell from time to time in a conventional manner. The well 18 also serves as a vent hole for acid fumes and the upper end of the well is closed by a detachable vent cap or plug 20. Each cell 12 has a pair of cell posts 22 and 24, one negative and one positive, which are connected to corresponding posts of adjacent cells by connectors 26. A pair of cables 28 and 30 are attached to cell posts at end cells 12 by connector members 32 and 34 respectively.

The container or tray 14 is a rectangular member for holding the cells 12 in the desired position. The upper end of each end wall of the tray 14 is provided with an opening 36 at each end for lifting and carrying the battery.

The cover 10 is a rectangular member which is co-extensive with the top surface 16 of the cells 12. The cover 10 is an inverted U-shape member having an intermediate portion 38 and down-turned flange portions 40 and 42 (FIGS. 3 and 4) the lower edges of which rest upon the upper surfaces 16 of the several cells 12. The cover 10 is composed of a thermoplastic resin such as polyvinyl chloride, polyethylene, and polypropylene or mixtures thereof. The cover 10 also includes a plurality of spaced openings 44 aligned with the tubular filling wells 18. Although the cover 10 normally rests in place on the top of the assembled cells 12, the vent well receiving openings 44 may be only slightly larger than the tubular wells 18 and thereby provide a snug fit for holding the cover 10 in place in a detachable manner. As shown in FIG. 1, opposite ends of the intermediate portion 30 are provided with notches 46 which are aligned with the openings 36 in the end of the tray 14 to facilitate manual or power operated lifting of the battery.

In addition, vent openings 48 may be provided at desired locations along the flanges 40 and 42 and space means 50 may be provided in the flange 40 for the cables 28 and 30. The positive and negative lead exit portions are identified by suitable markings.

When disposed in place as shown in FIG. 1, the cover 10 serves as a barrier between the upper ends of the filling wells 18 and the top surfaces 16 of the cells 12 together with the connectors 26, the cables 28 and 30 and their connectors 32 and 34 to the terminal posts of the battery. As a result corrosion of the connectors and other metal parts on the top side 16 of the cells 12 is avoided because the acid fumes emanating from the filling wells 18 and through the caps 20 are preventing from attacking such metal parts.

Accordingly, the storage battery cover of the present invention satisfies a long existing problem in the art by preventing the corrosion of metal members on the top side of a battery and connector shortage due to mine dust. Moreover, the cover prevents the cover from being contaminated with dirt, dust and other contaminants which normally contribute to the decrease in efficiency of a storage battery during its lifetime.

It is understood that the above specification and drawings are merely exemplary and not in limitation of the invention.

What is claimed is:

1. A storage battery assembly comprising a plurality of battery cells, each cell having a top surface and a vent extending upwardly therefrom, connecting bars disposed between adjacent cells electrically connecting said cells, a box-like container, said cells disposed within said container, said container, having opposite side and end walls forming an upper open end, the end walls of the container having opening means for lifting the battery assembly and located above the cell top surfaces, a detachable cover for the upper open end of the container, the cover having an inverted channel shape with an intermediate portion and a down-turned flange along each edge thereof, the cover being coextensive with the top surfaces of the cells and within the outer periphery thereof, the cover forming a compartment with the top surfaces of the cells and enclosing the connecting bars, the cover having vent-receiving openings said vents extending through and above said openings, the cover having air vent openings on at least one flange, and the cover having a notch at each end of the intermediate portion and aligned with the opening means in the container end wells, whereby the battery assembly is more readily maintained and protected from dust-laden atmospheres.

References Cited
UNITED STATES PATENTS

| | | | |
|---|---|---|---|
| 1,983,507 | 12/1934 | Woodbridge | 136—166 |
| 2,022,090 | 11/1935 | Roberts | 136—170 |
| 2,554,557 | 5/1951 | Brown | 136—177 |
| 2,608,596 | 8/1952 | White | 136—168 |

FOREIGN PATENTS 1,156,126  10/1963  Germany.

WINSTON A. DOUGLAS, Primary Examiner

P. D. ROSENBERG, Assistant Primary

U.S. Cl. X.R.

136—181